3,508,104
Patented Apr. 21, 1970

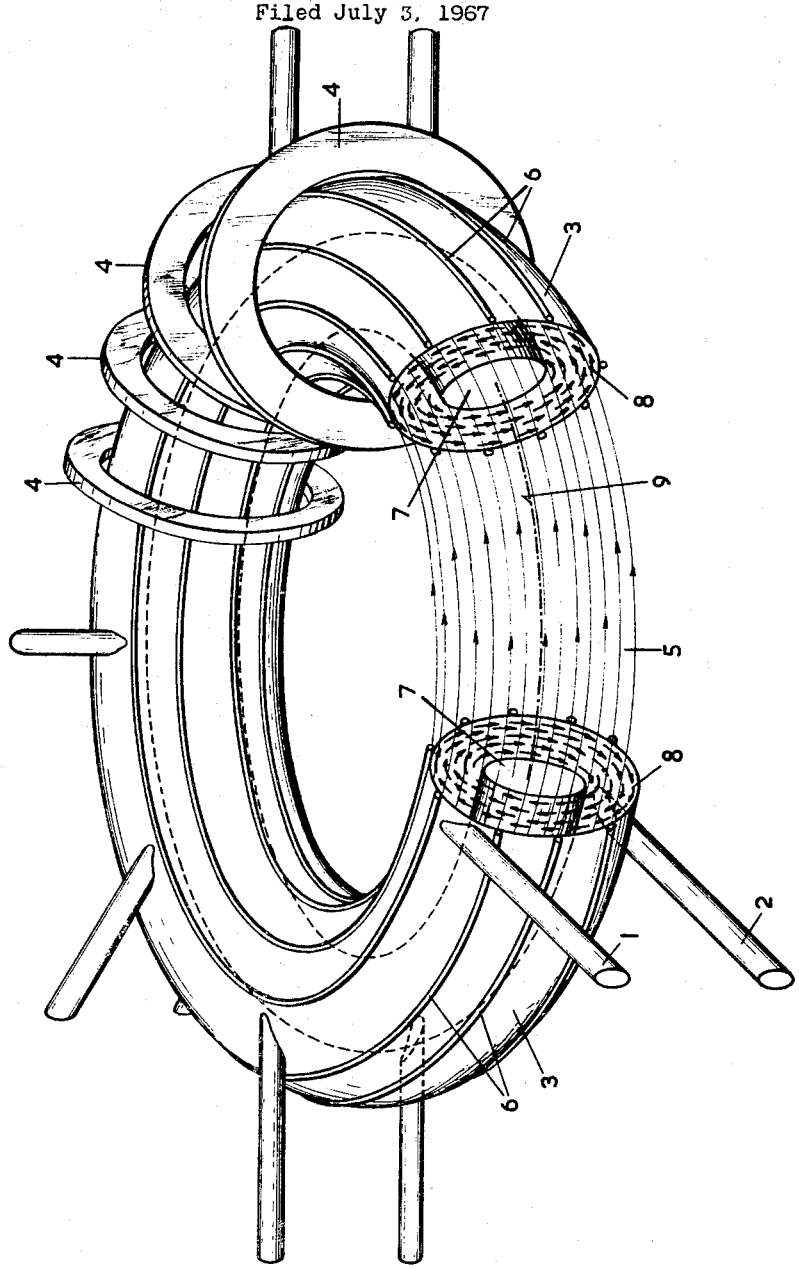

3,508,104
APPARATUS FOR THE STABLE CONFINEMENT OF A PLASMA
Cornelis Marius Braams, Utrecht, Netherlands, assignor to Stichting voor Fundamenteel Onderzoek der Materie, Utrecht, Netherlands, a foundation of the Netherlands
Filed July 3, 1967, Ser. No. 650,885
Int. Cl. H05h 1/02
U.S. Cl. 313—161                                                        2 Claims

ABSTRACT OF THE DISCLOSURE

A plasma is stabilized against magnetohydrodynamic and velocity-space instabilities by being confined by a cold gas blanket in a toroidal magnetic field. A ring whirl helps to define the equilibrium position, to stabilize against deviations from the steady-state, and to allow a poloidal field component.

This invention relates to the stable confinement of a hot plasma. The plasma stabilization is one of the most difficult problems in the plasma physics. A hot plasma, that is, a highly ionized gas mixture, when confined by means of a magnetic field, is extremely unstable as a result of its many degrees of freedom, and the extremely high temperature of about $2.10^{8}$° K. required, for example, for nuclear fusion reactions in a D.T. plasma, imposes very severe requirements on its stability.

Most of the methods used for confining plasma employ magnetic fields. In the various configurations which have hitherto been used, it is found that the plasma thus confined is unstable. The result of the instabilities is that the plasma can escape from its magnetic confinement, and cools off at the wall of the vessel in which it is contained.

The dominant instabilities in a plasma are the magnetohydrodynamic and velocity-space instabilities. Velocity-space instabilities occur particularly in so-called open systems. Such systems have a loss cone, through which particles whose velocity vector makes a small angle with the magnetic field lines can escape from the plasma. The resulting change in the velocity distribution function of the charge carriers can give rise to instabilities. The best weapon against these instabilities is a closed system.

In view of magnetohydrodynamic exchange instabilities, however, a closed system is undesirable.

As a matter of fact, the only manner known up till now for suppressing this type of instabilities resides in the use of a so-called minimum-B configuration. It is possible, however, to realize such a configuration in a closed system It has not hitherto been found possible to avoid both of the instabilities referred to at the same time. It is an object of the present invention to provide a solution for this difficulty.

To this effect, the apparatus according to the invention is so constructed that the plasma has the shape of a closed ring or toroid, that a cold gas blanket is provided around the plasma, and that an external toroidal magnetic field is applied by means of induction coils.

The pressure of the plasma must be compensated for by the pressure of the cold gas blanket as much as possible. It is inevitable, however, that there remains a residue of diamagnetism or paramagnetism, as a consequence of which hydromagnetic instabilities may arise. To suppress these, a rotary movement about the toroidal axis is imparted to the cold gas. This results, firstly, in proper centering of the plasma. As a result of the centrifugal force field, the gas assumes a position of minimum potential energy adjacent the axis. In addition, the gas blanket has a stabilizing effect on the instabilities which may arise out of residual paramagnetism or diamagnetism. This stabilizing effect may be further enhanced by conducting an electric current so as to form a poloidal magnetic component. This current, which may be utilized for the heating of the plasma, must not be so high, of course, as to result in pinch instabilities which cannot be suppressed.

The toroidal shape is beneficial for minimizing velocity-space instabilities. As a result of the fact that the plasma pressure is for the greater part compensated by the gas pressure, magnetohydrodynamic exchange instabilities are avoided or highly reduced. The fact is that in that case there is little, if any, diamagnetic energy to allow such disturbances to grow. The residue, if any, is stabilized by means of the rotation of the gas. The magnetic field is required to reduce the heat conductivity. It is of essential importance that this magnetic field has, as well as possible, its vacuum configuration.

Alfvén and Smårs have proposed (Nature 188, 801 (1960)) to confine plasma by means of a cold gas blanket. Computations show that the heat loss through the gas blanket could be highly reduced by providing a strong magnetic field. Their experiments did not produce good results, however. In these experiments, the magnetic field was generated by an electric current in the plasma, so that the plasma pressure was balanced by a pressure term $B^2/2\mu_0$ instead of by the cold gas blanket. This produces similar instabilities as occur in experiments based on magnetic confinement.

One embodiment of the invention will be described, by way of example, with reference to the accompanying drawing, which shows, diagrammatically, an apparatus for the stable confinement of a plasma according to the present invention.

Referring to the drawing, cold gas is introduced through inlet 1 into the torus defined by the tube 3. By means of induction coils 4, a toroidal induction 5 is applied within the tube. The toroidal field (B) differs only slightly from the vacuum configuration. The pressure of the plasma (7) is therefore predominantly compensated by the pressure of the gas 8. The gas blanket is caused to rotate about the toroidal axis 9, and can be adjusted through inlet 1 or outlet 2.

The means for forming and heating the plasma are not shown in the drawing, there being various possibilities for achieving this, which are well-known to the art.

The pressure of the plasma being predominantly balanced by the cold gas, the pressure gradients in the plasma which can play a part in instabilities are only small. The rotation of the gas blanket produces a positive stabilization term for suppressing those magnetohydrodynamic instabilities which arise out of residual paramagnetism or diamagnetism.

In connection with the reduction of the heat conductivity and the heating of the plasma, it is of advantage to allow a poloidal component of the induction field. For this purpose, a current is induced in the plasma by means of coil 6. By virtue of the centrifugal stabilization, the permissible charge current is higher than it would be without such stabilization.

I claim:
1. An apparatus for stabilizing a plasma comprising a first toroidal closed-ring configuration containing a ring shaped plasma therein, a second closed-ring configuration coaxial with said first closed-ring configuration and defining a closed space therebetween, means for applying a toroidal magnetic field to said rings, said means comprising a plurality of externally mounted induction coils, means for providing said closed space with cold gas, the pressure of said cold gas substantially compensating the pressure of said plasma, said cold gas being introduced into said jacket so that it performs a rotary movement about the toroidal axis of the plasma to inhibit growth of magnetohydrodynamic instabilities resulting from possible incomplete pressure compensation.

2. An apparatus according to claim 1 wherein means are provided to pass an electric current through said plasma, the strength of said current being such that the magnetic field generated by said current cannot cause instability.

No reference cited.

JAMES W. LAWRENCE, Primary Examiner
C. R. CAMPBELL, Assistant Examiner

U.S. Cl. X.R.
176—1, 3; 313—153